United States Patent [19]

Montalvo, Jr.

[11] 3,869,354
[45] Mar. 4, 1975

[54] AMMONIUM ION SPECIFIC ELECTRODE AND METHOD THEREWITH
[75] Inventor: Joseph G. Montalvo, Jr., New Orleans, La.
[73] Assignee: The Unites States of America as represented by the Secretary of the Department of Health, Education and Welfare, Washington, D.C.
[22] Filed: Apr. 6, 1973
[21] Appl. No.: 348,673

[52] U.S. Cl............ 204/1 T, 204/195 B, 204/195 P
[51] Int. Cl.... G01n 27/30, G01n 27/46, G01n 3/14
[58] Field of Search............. 204/195 P, 195 B, 1 T

[56] References Cited
UNITED STATES PATENTS
| | | | |
|---|---|---|---|
| 3,357,908 | 12/1967 | Riseman et al. | 204/195 |
| 3,649,505 | 3/1972 | Strickler et al. | 204/195 P |
| 3,673,069 | 6/1972 | Niedrach et al. | 204/195 G |
| 3,689,222 | 9/1972 | McFarland et al. | 204/195 P X |
| 3,776,819 | 12/1973 | Williams | 204/1 T |

OTHER PUBLICATIONS
G. G. Guilbault et al., Anal. Chem., Vol. 44, No. 13, pp. 2,161–2,166 (1972).

Primary Examiner—G. L. Kaplan
Attorney, Agent, or Firm—Browdy and Neimark

[57] ABSTRACT

An electrode specific for ammonium ion is made by covering the surface of a monovalent cationic electrode with a membrane permeable to ammonia but impermeable to interfering cations such as sodium and potassium. A thin layer of buffer-electrolyte is trapped between the surface of the electrode and the ammonia permeable membrane. The reference electrode is placed, via a small plastic tubing, in the buffer-electrolyte trap. When this electrode device is dipped into a solution containing ammonia ion, of which there is an equilibrium concentration of ammonia, ammonia gas (dissolved in the sample solution) passes through the gas permeable membrane over the electrode to again produce ammonium ion. The latter is potentiometrically sensed by the active surface of the monovalent cationic electrode.

10 Claims, 6 Drawing Figures

PATENTED MAR 4 1975 3,869,354

AMMONIUM ION SPECIFIC ELECTRODE AND METHOD THEREWITH

FIELD OF THE INVENTION

The present invention relates to an electrode specific for ammonium ion, and more particularly to an electrode which is specific for the determination of ammonium ion in a solution which contains other monovalent cations such as sodium and potassium ions.

BACKGROUND OF THE INVENTION

In many applications, it is necessary to test for the presence of ammonium ion in a solution without encountering interference due to the presence of cations such as sodium and potassium. One such application is in the detection of enzymes and substrates in body fluids. The presence of urease in a body fluid can be detected by adding urea thereto and testing for the production of ammonium ion. In the past, however, the only procedures for such an ammonium ion assay were complex procedures requiring a wet chemistry technique.

Electrode sensors have been developed which are capable of determination of the enzyme urease [Montalvo, *Analytical Biochemistry*, 38, 357 (1970)] and its substrate urea [Guibault et al., *J.M. Chem. Soc.* 92, 2533 (1970)]The uriase enzyme sensor was made by coupling the substrate urea to the active surface of a cationic electrode responsive to ammonium ion, a product of the urea-urease reaction. The electrode was covered with a layer of cellophane trapping a thin layer of urea solution between the glass sensing bulb and the membrane. When the electrode was dipped into a solution containing urease, the urea which diffused out of the cellophane membrane reacted with urease (which cannot diffuse through the membrane) to produce ammonium ion at the membrane surface. The build-up of an ammonium ion activity gradient caused diffusion of the ion back to the electrode, where it was sensed.

The urea sensor was made by immobilizing the enzyme urease over a glass cationic electrode. When this electrode was dipped into a solution containing urea, the urea diffused into the immobilized urease layer and reacted with the enzyme to produce ammonium ion, which was detected by the cationic electrode.

Application of the above principles of operation to detect enzymes and substrates in body fluids via the production of ammonium ion have been hampered by the lack of specificity of the available cationic (monovalent) glass electrodes for ammonium ion in the presence of sodium and potassium. To date, no such electrode has been designed.

Clark et al., *Ann. N.Y. Acad. Sci.* 102, 29 (1962) proposed an ammonium ion electrode by placing an ammonia permeable membrane over a pH electrode. No work was presented in this paper to show that this concept might work. Okada et al., *Kogyo Kagaku Zasshi*, 72, 1407 (1969), used the same principle described by Clark et al., to measure ammonia concentration in gas mixtures. Again, no work was performed to indicate this concept could be useful in determining ammonium ion in solution. Both of these methods rely upon pH electrodes which respond only to hydrogen ion concentration. Therefore, they would only be operative in test solutions having a high pH, as for example, between 11 and 13. Accordingly, these processes would not be desirable for test solutions such as physiological solutions with a pH between 7 and 11.

SUMMARY OF THE INVENTION

The present invention overcomes the disadvantages of measuring ammonium ion concentration by a wet chemistry technique and demonstrates an electrode specific for measuring ammonium ion in solution at physiological pH's and in the presence of interfering ions such as sodium and potassium ions.

It is, accordingly, an abject of the present invention to overcome the disadvantages of the prior art, such as indicated above.

It is another object of the present invention to provide an electrode specific for ammonium ion in the presence of interfering ions such as sodium and potassium ions.

It is still another object of the present invention to provide a totally specific ammonium ion electrode which can operate at or near physiological pH's.

It is yet another object of the present invention to provide an electrode capable of detecting ammonium ion produced via the urea-urease reaction in physiological solutions.

It is another object of the present invention to provide for the improved determination of ammonium ion.

It is another object of the present invention to provide for the determination of ammonium ion in physiological solution without interference from other cations.

The ammonium specific electrode in accordance with the preferred form of the present invention is made by covering the surface of a monovalent cationic electrode with a hydrophobic membrane permeable to ammonia but impermeable to interfering cations such as sodium and potassium. A thin layer of buffer-electrolyte is trapped between the glass surface of the electrode and the ammonia permeable membrane. The buffer maintains a fixed pH over the electrode surface. When this electrode device is dipped into a solution containing ammonium ion of which there is equilibrium concentration of ammonia, ammonia gas (dissolved in the sample solution) passes through the gas permeable membrane covering the electrode to again produce ammonium ion. The latter is potentiometrically sensed by the active surface of the monovalent cationic electrode.

The above and other objects, advantages and the nature of the invention will be more readily apparent from the following detailed description of preferred embodiments taken in conjunction with the drawing, wherein:

DESCRIPTION OF THE PREFERRED EMBODIMENTS

Figure 1:
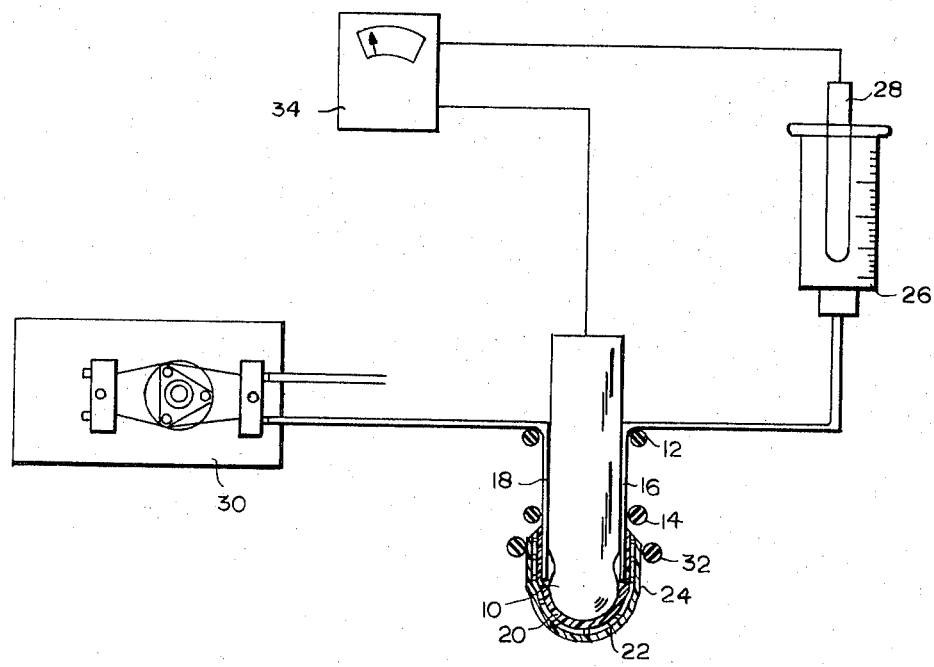
FIG. 1 is a schematic cross-sectional view of the ammonium ion specific electrode in accordance with the present invention.

A cationic electrode 10 such as a Beckman 39137 mono-valent cationic electrode is the basis upon which the ammonium ion specific electrode of the present invention is prepared. Two O-rings 12 and 14 are placed over the stem of the electrode. O-ring 12 is placed approximately two inches below the active surface of the electrode while O-ring 14 is placed approximately one-half inch below the active surface of the electrode. Two microplastic tubings 16 and 18 are positioned under the O-rings and on opposite sides of the glass bulb 10. The tubings preferably have an I.D. of about 0.034 inches and an O.D. of about 0.050 inches. The tubings 16 and 18 extend about 1 mm over the glass sensing bulb 10. Tubings 16 and 18 should be securely fixed to the stem of the electrode 10 to prevent movement of the tubing under the O-rings 12 and 14 as, for example, by masking tape, string and/or adhesive cement, e.g. epoxy resin.

A peice of cellophane 20 covered with a piece of 150 $\mu$ nylon netting 22 are placed over the electrode 10 (the nylon 22 being the outer covering) and held in place over the glass bulb 10 with another O-ring 32 positioned just below the active surface of the glass bulb 10. The cellophane 20 and nylon netting 22 are preferably about 2 × 2 in size. It must be carefully observed that the cellophane 20 and nylon netting 22 cover the tips of the tubings 16 and 18. Excess membrane 20 and netting material 22 are then cut flush with the O-ring 32 and are sealed to the glass electrode 10 with a suitable sealant such as, for example, RTV-11 made by the General Electric Company, silicone resin or epoxy resin.

A suitable gas permeable membrane 24 is then placed over or coated upon the covered electrode. Several types of such membranes are described below.

The ammonium ion specific electrode, complete with membrane coverings and buffer-electrolyte inlet and tubings is now ready to be connected to the reference electrode and potentiometer.

The exposed tip of one of the tubings 16 is connected to a ml syringe 26 mounted against the cationic electrode 10. The exposed tip of the other tubing 18 is connected to an inlet tube of a roller pump 30. The syringe 26 filled with buffer-electrolyte provides electrical contact with the buffer-electrolyte trap between the glass surface of the electrode 10 and ammonia permeable membrane 24. The mode of operation of this electrode dictates the position of the reference electrode 28 with respect to the ammonia permeable membrane 24, otherwise the observed potential of the electrode would be due in part to an electric potential across the ammonia permeable membrane 24. This unwanted potential is excluded from the observed potential by placing the reference electrode 28 in the buffer-electrolyte filled syringe, which buffer-electrolyte is continuously connected by means of a small plastic tubing 16 with the buffer-electrolyte in the buffer electrolyte trap between the glass surface of the electrode 10 and ammonia permeable membrane 24.

The roller pump 30 applies gentle suction to the membrane trap over the electrode 10, which forces the buffer in the trap over the electrode 10 and removes air bubbles. The buffer-electrolyte pumped out of the electrode system may be discarded. The cationic electrode 10 and reference electrode 28 are connected to a potentiometer as, for instance, a Corning research pH meter. The internal reference electrode 28 is connected to the reference electrode terminal and the membrane wrapped cationic electrode 10 is connected to the indicating electrode terminal on the pH meter. The pH is operated in the mv mode. The recorder terminals of the pH meter may be connected to a mv recorder as, for example, a Sargent mv recorder. The sensitivity of the recorder is preferably adjusted so that 1 mm = 1 mv.

Several types of thin ammonia permeable membrane may be used in the present invention. These include silicone polycarbonate (Type XD-7 powder, G.E. Company), collodion (23% solution, Curtin Chemical Co.), 40% leucine/60% methionine and $CO_2$ silastic membrane. The silicone polycarbonate membrane may be prepared as follows: Silicone-polycarbonate powder (1.5g) is dissolved in 25 ml of cyclohexanone and cast over water. A large oblong pyrex dish is filled with water. The surface of the water is wiped clean by pulling a sheet of tissue paper slowly across the entire length of the Pyrex dish. Another sheet of tissue paper is placed over the water leaving about one-half inch space between the tissue paper and a narrow side of the dish. A little of the polymer solution is poured over the one-half inch space. The tissue paper is then pulled slowly over the surface of the water spreading the polymer solution and forming a very thin film.

Thin collodion membranes may be cast over glass plates. The glass plates are cleaned with chromic acid prior to casting. A single layer of masking tape (100 $\mu$ thick) is laid on opposite sides of the glass. A little of the 23% collodion solution is poured on the plate, then spread evenly over the plate with a flat edge of glass pulled over the masking tape. The resultant thin film is allowed to dry 4 minutes at room temperature, chilled in ice water for 14 minutes, removed from the glass plate and blotted dry with tissue paper. The film is then examined under a low power lens for holes, soaked for two hours in cold distilled water, and then soaked for two hours in ice cold buffer.

Thin $CO_2$ silastic membranes are available commercially from, for example, Instrumentation Lab, Inc.

Figures 2, 3:
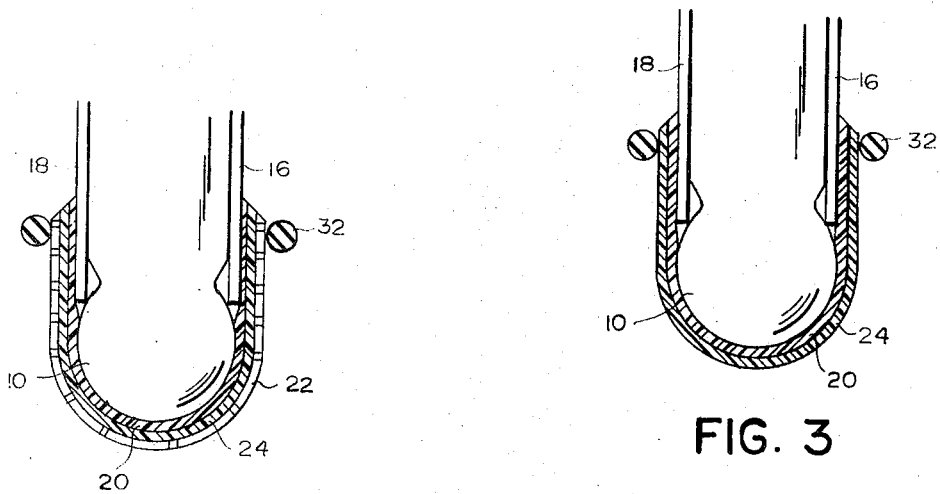
FIG. 2 is a schematic cross-sectional view of the tip of another embodiment of the electrode in accordance with the present invention.
FIG. 3 is a schematic cross-sectional view of the tip of still another embodiment of the electrode in accordance with the present invention.

When silicone-polycarbonate film is used as the ammonia permeable membrane 24, the electrode 10, complete with coverings, as described hereinabove, is dipped under the silicone-polycarbonate film which has been cast on water and raised from the water. The silicone-polycarbonate film is held in place over the nylon netting 22 by virture of its ability to cling to the netting. When collodion or leucine/methionine is used as the ammonia permeable membrane 24, the collodion film should be placed between the cellophane 20 and nylon netting 22 layers as is shown in FIG. 2. When $CO_2$ silastic membrane is used, the silastic membrane may be used in place of the nylon netting 22 as shown in FIG. 3.

Variation of the spacers (coverings) between the glass sensing bulb 10 and the ammonia permeable membrane 24 results in a range of distances of about 13 to 160 μ between the glass 10 and ammonia permeable membrane 24. The coverings under the ammonia permeable membrane 24 serve not only as spacers, but also as a reservoir for internal filling solution. The spacers allow the gas permeable membrane 24 to be slightly wrapped over the electrode 10 while preventing complete extrusion of the internal filling solution. The volume of the internal solution is about 25 μ when the spacer thickness is 160 μ. It should be understood that the cellophane membrane 20 is permeable to the buffer solution used.

The preferred method of operation of the present electrode will now be discussed. One ml of 0.5 M tris (hydroxymethyl) aminomethane buffer is placed in the syringe 26. The reference electrode (a standard pH sensing glass electrode) is placed in the syringe 26. The roller pump 30 is turned on, pumping rate adjusted to 10 microliters per minute, and pumping is continued until the space between the cationic electrode 10 and membrane 24 is completely flushed with the buffer. This procedure is done with the electrode 10 suspended upright in the air and not in water so that any leaks can be quickly detected. The ammonium ion specific electrode is then dipped in the test solution and the roller pump 30 turned off.

All test measurements described hereinbelow were carried out in a thermostated cell at 22°–37°C. A Teflon bar is used to stir the 50 ml test solution, buffered with 0.5 M tris, pH 7.3 – 9.0, and is tuned to an appropriate speed such that only a small vortex is observed in the test solution. Unless otherwise stated, the pH of the test solution is exactly the same as the pH of the buffer-electrolyte trap between the glass electrode 10 and gas permeable membrane 24.

After recording the buffer potential for a few minutes, the test cation ($NH_4^+$, $Na^+$, or $K^+$) is added to the test solution with a microsyringe from 0.5 M stock solutions. A potential vs. time curve is recorded for periods up to 25 minutes. The electrode is then placed in an automatic electrode washer (miniature pipet washer) and the potential monitored until a low level of ion concentration is obtained in the membrane trap over the electrode. The membrane trap can also be flushed out after a run by turning on the roller pump 30 for a few minutes at 10 microliters per minute.

Table I summarizes the experimental results obtained with various ammonia permeable membranes, at different temperatures, and at different pH's. All of the data shown in Table I was obtained with the pH of the test solution equal to the pH of the buffer-electrolyte trap over the glass surface of the cationic electrode. The rate of response of the ammonium ion specific electrode depended on the temperature and pH of the test solution and the ammonia permeability of the ionic ($Na^+$, $K^+$) impermeable membrane.

TABLE I

EFFECT OF VARIATION OF AMMONIA PERMEABLE MEMBRANE

| Membrane | Membrane Thickness (μ) | Buffer Electrolyte Trap, Thickness (μ) | Temp. °C | Buffer pH | Reagents Present in Test Sample | Time Required for Steady State Potential Response (minutes) | Duration of Experimental Time in Which no Potential Response was Observed for Cation Added to Solution (minutes) |
|---|---|---|---|---|---|---|---|
| 50% Silicone/ 50% Polycarbonate Copolymer | 11 | 160 | 25 | 9.0 | 0.01 M $NH_4Cl$ | 12 | |
| | 2.4 | 160 | 25 | 9.0 | 0.01 M KCl 0.01 M KCl | | 12 |
| | ~1. | 160 | 37 | 8.5 | 0.001 M $NH_4Cl$ | 15 | 25 |
| | | | 22 | 8.5 | 0.001 M $NH_4Cl$ | 19 | |
| | ~1. | 160 | 37 | 8.0 | 0.001 M KCl 0.001 M $NH_4Cl$ | 18.5 | 15 |
| $CO_2$ Silastic | 65 | 13 | 25 | 8.0 9.0 | 0.001 M $NH_4Cl$ 0.01 M $NH_4Cl$ | 21 | 20 |
| 40% Leucine/ 60% Methionine | 0.8 | 75 | 25 | 9.0 | 0.0833 M KCl 0.0833 M $NH_4Cl$ | Response still increasing after 11 minutes | 17 |
| Collodion | ~8 | 150 | 25 | 7.3 | 0.07 M KCl 0.1 M NaCl 0.0833 M Urea 25 mg. Urease 0.0833 M Urea plus 25 mg. Urease 0.001 M $NH_4Cl$ | 19 19 | 19 19 19 19 |

Figure 4:
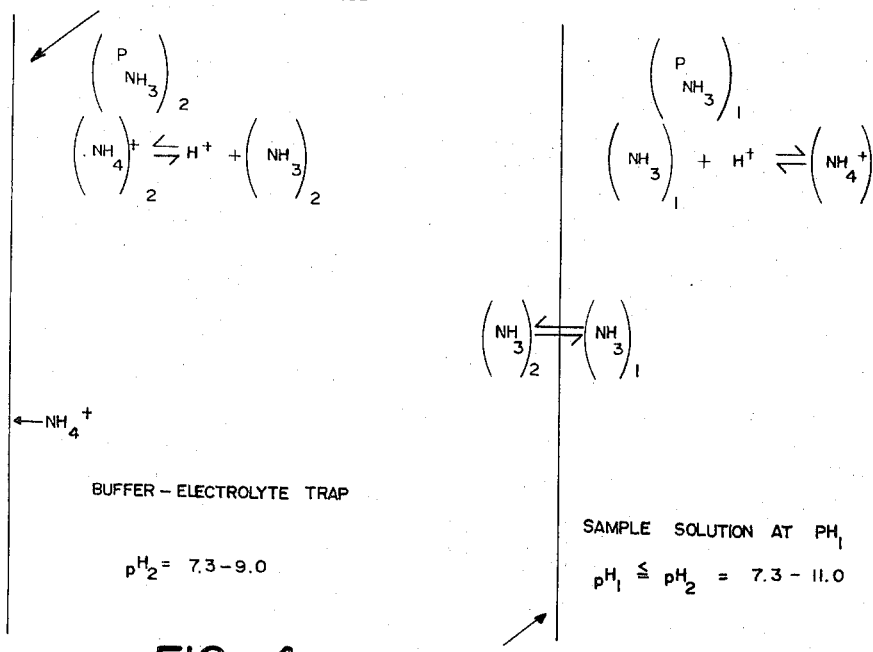
FIG. 4 is an illustration of the chemistry involved in the ammonium ion specific electrode in accordance with the present invention.

The variation of the steady state response to ammonium ion vs. the pH and temperature of the test solution is indicative of a mechanism in which the dissolved ammonia in the test solution and not the ammonium ion permeates the polymeric membrane. FIG. 4 shows an illustration of the chemistry involved in this ammonium ion specific electrode. The driving force for ammonia transport through the gas permeable membrane is the partial pressure of the ammonia, $P_{NH_3}$, which is proportional to the aqueous ammonia concentration:

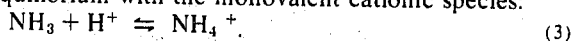

$$P_{NH_3} = K [NH_3]_{aqueous} \quad (1)$$

where K = Henry's Law constant. As the temperature is increased, the partial pressure of the dissolved $NH_3$ also increases. When the ammonium ion specific electrode is placed in a test solution containing $NH_4^+$ ion, there is an equilibrium between the ammonia and ammonium ion depending on the pH of the solution. The partial pressure of the ammonia in the test solution results in the gas dissolving in the membrane on the test solution side and diffusing through the membrane under the influence of the pressure difference, then comes out of the membrane on the low pressure side (the bufferelectrolyte trap over the glass electrode). The diffusion of ammonia across the membrane continues, until at equilibrium, $$(P_{NH_3})_2 = (P_{NH_3})_1 \quad (2)$$

The ammonia in the buffer-electrolyte trap is also in equilibrium with the monovalent cationic species:

$$NH_3 + H^+ \rightleftharpoons NH_4^+. \quad (3)$$

The relative amount of ammonia and ammonium ion is determined by the solution pH. The ammonium ion diffuses to the surface of the cationic electrode where it is sensed.

The ammonia gas transport mechanism was observed with collodion, leucine-methione, and silicone-polycarbonate membranes.

The lack of response of this electrode to sodium and potassium ions is due to the fact that the characteristics of the gas transport membranes of the present invention do not allow for the requisite mechanisms for transport of these ions across the membrane. The permeability of a gas transport membrane to a particular gas depends on the solubility multiplied by the rate of diffusion. The solubility of sodium and potassium in the membranes studied is very, very low; therefore, no transport of these ions can occur.

Figure 5:
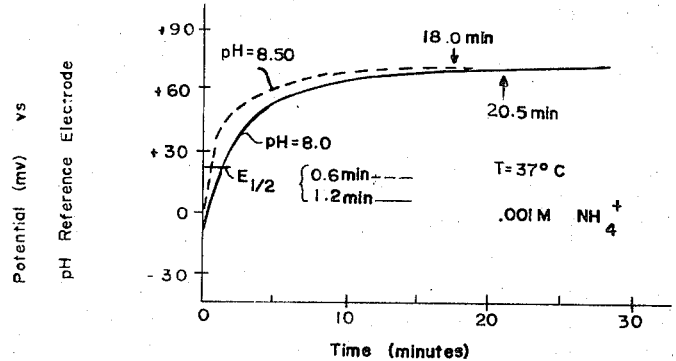
FIG. 5 is a graph showing ammonium ion response curves with the silicone-polycarbonate membrane over the gas sensing tip of the electrode of the present invention.

Most of the investigations were performed with the silicone-polycarbonate membrane. FIG. 5 shows ammonium ion response curves with the silicone-polycarbonate membrane over the gas sensing tip of the electrode. As shown in FIG. 5, a steady state response to ammonium ion was obtained at pH 8.5 in 18.0 minutes and at pH 8.0 in 20.5 minutes (at 37°C) for 0.001 M $NH_4Cl$. At these mildly basic conditions, the fraction of the total ammonium ion concentration added to the solution which exists as ammonia is 5.3% at pH 8.0 and 15.2% at pH 8.5. At pH 7.5 and 7.0 the percent ammonia would be 1.75% and 0.56% respectively (calculated from the appropriate equilibrium constant). In the response studies with the silicone-polycarbonate membrane over the Beckman cationic electrode, the same steady state potential response was obtained for a given ammonium ion concentration with and without the silicone-polycarbonate membrane over the electrode. From this data, the linear range of the ammonium ion specific electrode to ammonium ion was essentially the same as for the uncoated cationic electrode. The linear range was from about $5.5 \times 10^{-4}$ to 0.1 M $NH_4^+$.

The response of the ammonium ion specific electrode to the urea-urease reaction (Table I) is noteworthy. As shown in the table, the electrode did not respond to either 0.07 M KCl, 0.1 M NaCl, 0.0833 M urea, or 25 mg urease in 19 minutes. However, a potentiometric equilibrium ammonium ion response was obtained with added 0.0833 M urea and 25 mg urease in 19 minutes. Clearly, coupling a cationic glass electrode with a hydrophobic ammonia gas permeable membrane resulted in an electrode specific for ammonium ion in the presence of sodium and potassium. Thus, the applicability of the gas transport mechanism at or near physiological pH's where the roatio of $NH_3$ to $NH_4^+$ ion concentration is about 0.01 was experimentally verified.

To optimize the equilibrium response times to $NH_4^+$ ion at physiological pH's it is necessary to: (a) reduce the thickness of the buffer-electrolyte membrane trap over the glass electrode and (b) to optimize the gas permeability of the ammonia membrane by varying its composition and thickness.

More rapid potentiometric determination of ammonium ion in the presence of sodium and potassium ion with the present state of the art ammonium ion specific electrode is possible by initial rate measurements. In fact, $NH_4^+$ ion can be determined in less than one minute at pH 8.0, and in one minute at pH 7.5 by computing the intial rate of change in the potential, which is proportional to the ammonium ion concentration. Note that the values for the half-response potential in FIG. 5 are 0.6 minutes at pH 8.5 and 1.2 minutes at pH 8.0.

In the work cited above, the pH of the buffer-electrolyte trap over the electrode was identical to that of the test solution. Because the gas transport membrane permits only $NH_3$ and not $NH_4^+$ ion to diffuse across the membrane, the ammonium ion specific electrode can be made much more sensitive to ammonium ion than could be detected by the Beckman electrode alone. A theoretical study predicts this could be done simply by making the pH in the test solution, $pH_1$, more basic than the pH of the buffer electrolyte trap $pH_2$. By making the test solution more basic, for example to a pH of about 13, the equilibrium equation (3) is shifted to the left and more ammonia gas is present in solution. Therefore, the osmotic forces would tend to cause the $NH_3$ to diffuse across the membrane. Once across the membrane, the less basic buffer trap solution would cause equation (3) to shift back to the right, thus forming a relatively large concentration of $NH_4^+$ which is detected by the electrode. Therefore, at equilibrium, the activities of $NH_3$ on both sides of the ammonia permeable membrane would be equal, but the activity of $NH_4^+$ ion would be less in the test solution than in the buffer trap over the electrode.

Figure 6:
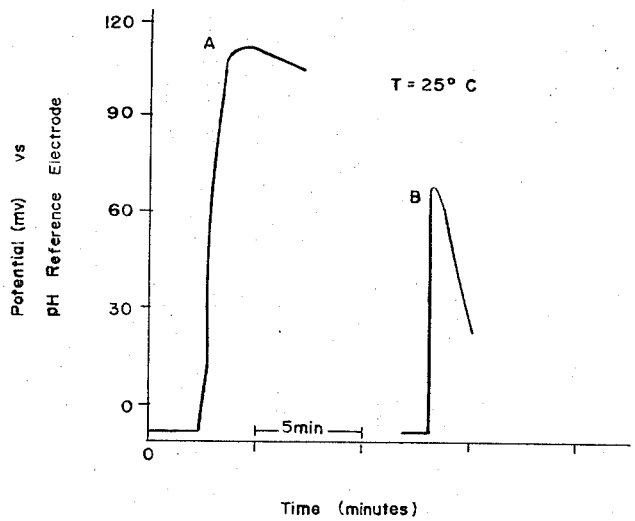
FIG. 6 is a graph showing ammonium ion response curves with pH stripping of $NH_3$ from test solution at pH 11.0. Curve A represents the electrode suspended in air above the test solution. Curve B represents the electrode dipped in the test solution.

The net result is a preconcentration of ammonium ion over the electrode surface, which should continue until the buffer capacity in the buffer-electrolyte trap is overcome. In theory, an increase in ammonium ion sensitivity of greater than 100 is predicted. FIG. 6 shows experimental verification of this theory. $NH_4OH$ was added to distilled water until the pH was 11.0. Curve A was obtained with the ammonium ion specific electrode suspended in air over the stirred solution. Curve B was obtained with the same solution except that the electrode was dipped into the solution. In both cases, there was a rapid rise of the potential as the ammonium ion concentration builds up in the buffer electrolyte trap; eventually, the buffer capacity of the solution in the membrane trap was overcome as the ammonia continued to diffuse into the trap and the potential peaked and became more negative. Thus, by pH stripping of ammonia from the test solution the electrode may be used in an ultra-sensitive mode in an air-stream or in an aqueous medium.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. An ammonium ion specific electrode, comprising:
   a monovalent cationic electrode having an active surface portion thereon sensitive to ammonium ion;
   an ammonia permeable, cation impermeable membrane surrounding the active surface of said electrode; and
   a layer of electrolyte between said membrane and said electrode, said electrolyte being buffered to maintain a constant pH therein as ammonia diffuses thereinto.

2. An ammonium ion specific electrode in accordance with claim 1 further including:
   a buffer-electrolyte permeable spacer placed between said electrode and said membrane.

3. An ammonium ion specific electrode, in accordance with claim 2, wherein said spacer comprises a layer of cellophane.

4. An ammonium ion specific electrode, in accordance with claim 3 wherein said spacer further includes a layer of nylon netting between said layer of cellophane and said membrane.

5. An ammonium ion specific electrode in accordance with claim 1 wherein said membrane is selected from the group consisting of 50:50 silicone-polycarbonate film, collodion film, 40% leucine/60% methionine film and $CO_2$ silastic film.

6. An ammonium ion specific electrode in accordance with claim 5 wherein said membrane is 50:50 silicone-polycarbonate film.

7. An ammonium ion specific electrode in accordance with claim 2 further including a layer of nylon netting outside said layer of membrane and in contact therewith.

8. An ammonium ion specific electrode in accordance with claim 1 wherein said buffer electrolyte contains tris (hydroxymethyl) aminomethane.

9. An apparatus for selectively detecting ammonium ion in the presence of interfering cations comprising:
   an ammonium ion specific electrode in accordance with claim 1;
   a reference electrode in contact with said buffer-electrolyte layer; and
   a potentiometer means for measuring the potential difference between said ammonium ion specific electrode and said reference electrode.

10. A method for selectively detecting ammonium ion in the presence of interfering cations comprising:
    placing the apparatus of claim 9 into a solution to be tested; and
    buffering the test solution to a pH more basic than the pH of said buffer-electrolyte,
    whereby the presence of ammonium ion will be selectively detected by said apparatus to a high sensitivity and will appear on said potentiometer.

* * * * *